United States Patent
Higashi (10) Patent No.: US 9,286,550 B2
(45) Date of Patent: Mar. 15, 2016

(54) IMAGE FORMING APPARATUS

(71) Applicant: Natsuyo Higashi, Toyokawa (JP)

(72) Inventor: Natsuyo Higashi, Toyokawa (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 367 days.

(21) Appl. No.: 13/645,691

(22) Filed: Oct. 5, 2012

(65) Prior Publication Data

US 2013/0088743 A1 Apr. 11, 2013

(30) Foreign Application Priority Data

Oct. 5, 2011 (JP) .................................. 2011-221241

(51) Int. Cl.
*G06K 15/02* (2006.01)
*G06K 15/00* (2006.01)
*H04N 1/00* (2006.01)
*H04N 1/32* (2006.01)

(52) U.S. Cl.
CPC .......... *G06K 15/005* (2013.01); *G06K 15/4055* (2013.01); *H04N 1/00888* (2013.01); *H04N 1/00904* (2013.01); *H04N 1/00954* (2013.01); H04N 1/00416 (2013.01); H04N 1/00832 (2013.01); H04N 1/00925 (2013.01); H04N 1/00957 (2013.01); H04N 1/32106 (2013.01); H04N 2201/0094 (2013.01); H04N 2201/3222 (2013.01); H04N 2201/3273 (2013.01); H04N 2201/3274 (2013.01)

(58) Field of Classification Search
None
See application file for complete search history.

(56) References Cited

U.S. PATENT DOCUMENTS 6,401,198 B1 * 6/2002 Harmer et al. ..................... 713/1
7,735,047 B1 * 6/2010 Anderson et al. ............. 716/116

(Continued)

FOREIGN PATENT DOCUMENTS

| JP | 7-028478 A | 1/1995 |
| JP | 2002-297715 A | 10/2002 |
| JP | 2003-080804 A | 3/2003 |

(Continued)

OTHER PUBLICATIONS

Office Action (Notification of Reasons for Refusal) issued on Oct. 22, 2013, by the Japanese Patent Office in corresponding Japanese Patent Application No. 2011-221241, and an English Translation of the Office Action. (5 pages).

*Primary Examiner* — Ashish K Thomas
(74) *Attorney, Agent, or Firm* — Buchanan Ingersoll & Rooney PC (57) ABSTRACT

An image forming apparatus that operates according to given operational conditions, comprising: a target power consumption receiving unit configured to receive a target value for power consumption; an option receiving unit configured to receive options selected by a user from among a plurality of options defining the operational conditions; a basic data storage unit storing therein basic data for each of the options; a calculation unit configured to calculate the estimated power consumption from the basic data according to the options selected by the user; an excess informing unit configured to inform the user when the estimated power consumption is greater than the target value; and an alternative option informing unit configured to inform the user of an alternative option when the estimated power consumption is greater than the target value, the alternative option reducing the estimated power consumption to be equal to or less than the target value.

8 Claims, 10 Drawing Sheets

(56) References Cited

U.S. PATENT DOCUMENTS

2009/0077399 A1* 3/2009 Noda et al. .................. 713/320
2009/0313484 A1* 12/2009 Millet et al. .................. 713/300

FOREIGN PATENT DOCUMENTS

| JP | 2004-004296 A | 1/2004 |
|---|---|---|
| JP | 2005-345663 A | 12/2005 |
| JP | 2006-330843 A | 12/2006 |
| JP | 2007-011043 A | 1/2007 |
| JP | 2007-065255 A | 3/2007 |
| JP | 2008-226032 A | 9/2008 |
| JP | 2009-070149 A | 4/2009 |
| JP | 2009-107141 A | 5/2009 |
| JP | 2009-116225 A | 5/2009 |
| JP | 2010-219621 A | 9/2010 |

* cited by examiner

Power saving condition entry screen

- Target power consumption [ 401 ] Wh

- Printing condition    ☐ Monochrome    ☐ Color     - Combination condition    ☐ Yes    ☐ No     - Batch printing    ☐ Yes    ☐ No    402

- Paper feed cassette    ☐ First stage    ☐ Auto     - Sleep mode    ☐ Yes    ☐ No

- Power consumption with selected options    ______ Wh  403

Comment

Please select options  404

[Confirm the settings] 405

FIG. 5

| Power consumption without power saving | | ●●●●Wh |
|---|---|---|
| Power-saving amount | Printing condition | ○○○○Wh |
| | Combination condition | ▲▲▲▲Wh |
| | Batch printing | △△△△Wh |
| | Paper feed cassette | ★★★★Wh |
| | Sleep mode | ☆☆☆☆Wh |

Power saving condition entry screen

- Power-saving period
  ☐ 1 month   ☐ 1 week   ☐ 1 day   ☐ Other     ← 801

- Target power consumption     Wh      Standard    Wh
                                ↙401                ↙802

- Printing condition    ☐ Color priority   ☐ Monochrome priority

- Combination condition  ☐ Yes  ·Both-side printing·2 in 1·4 in 1
                         ☐ No

- Batch printing         ☐ Yes  ○○ prints or more   ☐ No

- Paper feed cassette    ☐ Manual ·1st stage·2nd stage·3rd stage·4th stage
                         ☐ Auto                                              402

- Timing of sleep mode   ☐ Upon completion of printing
                         ☐ After a predetermined time After ○○ minutes
                         ☐ No ← 403
- Power consumption with selected options      Wh Comment                              ← 404      | Confirm
  Please select options for power saving        | the settings
                                                       ↘
                                                        405

IMAGE FORMING APPARATUS

CROSS-REFERENCE TO RELATED APPLICATIONS

This application is based on application No. 2011-221241 filed in Japan, the contents of which are hereby incorporated by reference.

BACKGROUND OF THE INVENTION (1) Field of the Invention

The present invention relates to image forming apparatuses, and particularly to technology of allowing users to easily determine settings for power saving.

(2) Related Art

In recent years, energy saving and power saving have been drawing increasing attention. Image forming apparatuses are not exceptions. There are demands for saving power consumption of image forming apparatuses.

To fulfill the demands, there has been a known technology of receiving input of a target value for power consumption of an image forming apparatus and controlling the fixing temperature and the fixing speed so that the image formation can be performed within a range of the target value, for example (see Japanese Patent Application Publication No. 7-28478). Another technology applicable to an image forming apparatus with a sheet post-processing unit such as a staple stacker has also been disclosed. According to this technology, some of drive units included in the image forming apparatus are stopped during the period for which the power consumption of the sheet post-processing unit is at the maximum (See Japanese Patent Application Publication No. 2005-345663). This technology suppresses the power consumption and the current consumption to be within a specified range.

Furthermore, there also has been disclosure of a technology of displaying a power consumption defined by the International ENERGY STAR Program and a measured power consumption and encouraging users of the image forming apparatus to save power (See Japanese Patent Application Publication No. 2009-107141). This technology is expected to realize power saving by promoting users' awareness.

However, the settings on image forming apparatuses could be different for each user due to sophistication in functionality of image forming apparatuses. Hence, an attempt to save energy under the settings expected by manufactures or international standards may cause inconvenience to the users or may be not able to realize sufficient energy saving. It is therefore desirable to save energy according to the settings determined by users.

In order for a user to appropriately apply energy saving changes to an image forming apparatus according to the settings determined by the user, the user is required to be familiar with various functions of the image forming apparatus. This brings too heavy burden on the user.

SUMMARY OF THE INVENTION

The present invention is made in view of the problem described above, and aims to provide an image forming apparatus that allows a user to easily apply changes for energy saving in conformity with the settings on the image forming apparatus determined by the user.

To fulfill the aim, one aspect of the present invention is an image forming apparatus that operates according to given operational conditions, comprising: a target power consumption receiving unit configured to receive a target value for power consumption; an option receiving unit configured to receive options selected by a user from among a plurality of options defining the operational conditions; a basic data storage unit storing therein basic data for each of the plurality of options, the basic data being used for calculating estimated power consumption; a calculation unit configured to calculate the estimated power consumption from the basic data according to the options selected by the user; an excess informing unit configured to inform the user when the estimated power consumption is greater than the target value; and an alternative option informing unit configured to inform the user of an alternative option among the plurality of options when the estimated power consumption is greater than the target value, the alternative option reducing the estimated power consumption to be equal to or less than the target value.

BRIEF DESCRIPTION OF THE DRAWINGS

These and other objects, advantages and features of the invention will become apparent from the following description thereof taken in conjunction with the accompanying drawings those illustrate a specific embodiment of the invention.

In the drawings:

FIGS. 10A and 10B show screens displayed on the operation panel 211 pertaining to a modification example of the present invention, where

DESCRIPTION OF PREFERRED EMBODIMENT

The following describes an embodiment of a fixing device and image forming apparatus pertaining to the present invention, with reference to the drawings.

[1] STRUCTURE OF IMAGE FORMING APPARATUS

First of all, the structure of the image forming apparatus pertaining to the present embodiment is described.

Figure 1:
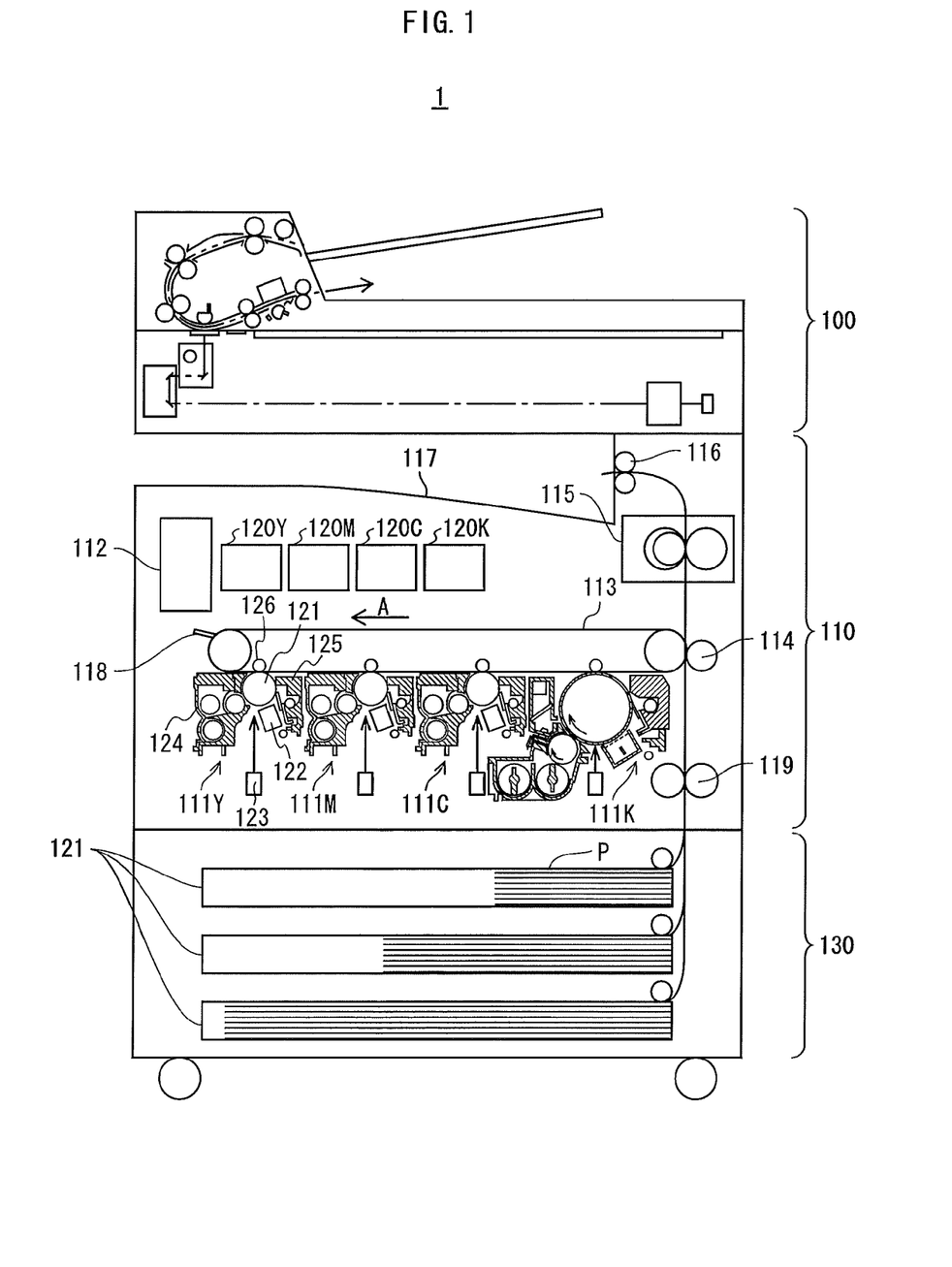
FIG. 1 shows primary components of an image forming apparatus pertaining to an embodiment of the present invention.

FIG. 1 shows the principal components of the image forming apparatus pertaining to the present embodiment. As shown in FIG. 1, the image forming apparatus 1 is a tandem color multi-function peripheral (MFP), and includes a document read section 100, an image formation section 110, and a paper feed section 130. The document read section 100 generates image data by optically reading a document through an Automatic Document Feeder (ADF) that takes a document placed on a document tray. The image data are stored in a later-described control unit 112.

The image formation section 110 includes imaging units 111Y, 111M, 111C and 111K, a control unit 112, an intermediate transfer belt 113, a pair of secondary transfer rollers 114, a fixing device 115, a pair of exit rollers 116, an exit tray 117, a cleaner 118, and a pair of timing rollers 119. The image formation section 110 is attached with toner cartridges 120Y, 120M, 120C, and 120K which respectively provide toner of colors of yellow (Y), magenta (M), cyan (C), and black (K).

The imaging units 111Y, 111M, 111C and 111K are provided with toner from the toner cartridges 120Y, 120M, 120C and 120K respectively, and form images of colors Y, M, C and K respectively under the control of control unit 112. The imaging unit 111Y, for example, includes a photosensitive drum 121, a charging device 122, an exposure device 123, a developing device 124 and a cleaner device 125. Under the control of control unit 112, the charging device 122 uniformly charges the outer circumferential surface of the photosensitive drum 121. The exposure device 123 forms electrostatic a latent image by performing image exposure on the outer circumferential surface of the photosensitive drum according to image data.

The developing device 123 provides toner to the outer circumferential surface of the photosensitive drum 121 and develops (i.e. visualizes) the electrostatic latent image. A primary transfer roller 126 is applied with transfer voltage, and transfers the toner image formed on the outer circumferential surface of the photosensitive drum 121 to the intermediate transfer belt 113 by static transfer (i.e. primary transfer). The cleaner device 125 neutralizes the charge on the outer circumferential surface of the photosensitive drum 121 by using a neutralization lamp, and scrapes off remaining toner on the outer circumferential surface by using a cleaning blade.

Similarly, each of the imaging units 111M, 111C and 111K forms a toner image in its corresponding color. The toner images in the respective colors undergo primary transfer, so as to be overlaid on the intermediate transfer belt 113. The intermediate transfer belt 113 is an endless rotating body that rotates in the direction shown by arrow A and carries the toner image resulting from the primary transfer to the pair of secondary transfer rollers 114.

The paper feed section 130 includes a paper feed cassette 131 that contains recording sheets P grouped according to their paper sizes, and supplies one of the recording sheets P to the image formation unit 110. While the toner images are carried by the intermediate transfer belt 113, the supplied recording sheet P is carried to the pair of secondary transfer rollers 114 via the pair of timing rollers 119. The timing rollers 119 are a pair of rollers, and adjust the timing at which the recording sheet P reaches the pair of secondary transfer rollers 114.

The secondary transfer rollers 114 are a pair of rollers, each at a different voltage, pressed against each other so as to form a transfer nip. The toner image on the intermediate transfer belt 113 undergoes a static transfer (secondary transfer) onto the recording sheet P at the transfer nip. The recording sheet P, with the toner image having been transferred thereto, is carried to the fixing apparatus 115. After the secondary transfer, any toner remaining on the intermediate transfer belt 113 is scraped off by the cleaner 118 upon being carried by further travel in the direction of arrow A, and discarded.

The fixing device 115 utilizes resistance heating. The fixing device 115 applies heat to and fuses a toner image, and presses the image to the recording sheet P. The recording sheet P with the toner image fused thereto is then made to exit onto the exit tray 117 by the exit rollers 116. Note that the control unit 112 controls the operations of the image forming apparatus 1 provided with the above-described components and an operation panel which is not depicted. The control unit 112 also exchanges image data with other devices such as personal computers (PCs), and receives print jobs, for example.

For the transfer of toner images, a transfer charger or a transfer belt may be used instead of the transfer rollers. For the removal of the toner remaining on the intermediate transfer belt 113, a cleaning brush, a cleaning roller, or the like may be used instead of the cleaner 118 (cleaning blade).

[2] STRUCTURE OF CONTROL UNIT 112

The following describes the structure of the control unit 112.

Figure 2:
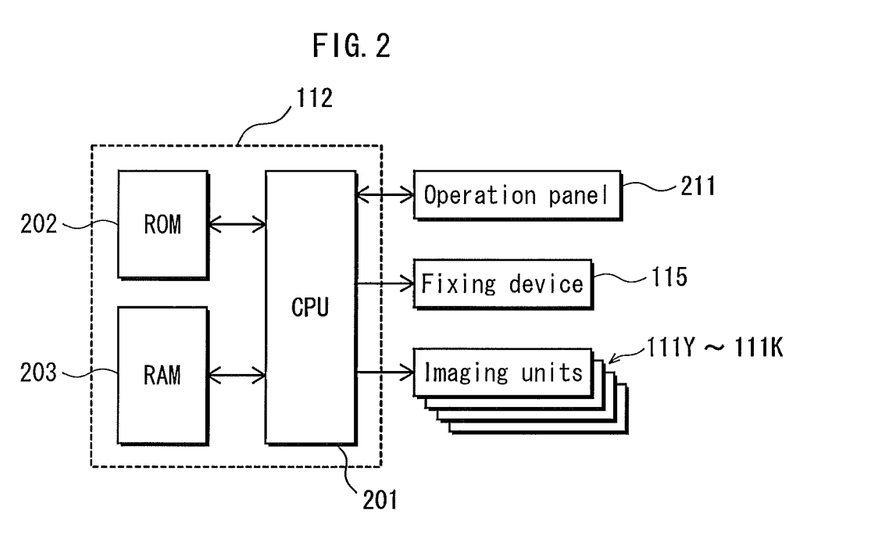
FIG. 2 is a block diagram showing primary components of a control unit 112.

FIG. 2 is a block diagram showing primary components of the control unit 112; As shown in FIG. 2, the control unit 112 includes a central processing unit (CPU) 201, a read only memory (ROM) 202 and a random access memory (RAM) 203. The CPU 201 reads a control program from the ROM 202 when the image forming apparatus 1 is powered on, and executes the program by using the RAM 203 as a work memory area. The control unit 112 thereby controls the operations of all the components of the image forming apparatus 1, including the operation panel 211, the fixing device 115, and the imaging units 111Y, 111M, 111C and 111K.

The operation panel 211 includes, for example, a liquid crystal display panel and a touch panel, and displays information for an operator of the image forming apparatus and receives an instruction input by the operator. The fixing device 115 fixes a toner image onto a recording sheet or enters the sleep mode according to an instruction from the control unit 112, for example.

[3] EXAMPLE SCREEN DISPLAYED ON OPERATION PANEL 211

The following describes an example screen displayed on the operation panel 211 which receives input of settings for saving the power consumption by the image forming apparatus 1.

Figure 3:
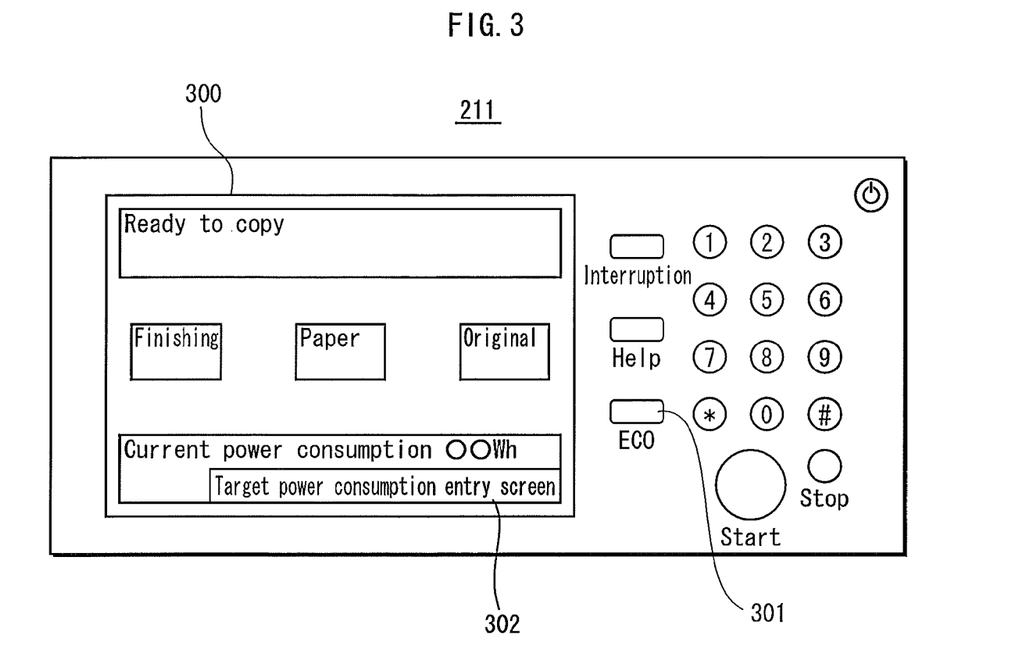
FIG. 3 shows an example screen displayed on an operation panel 211.

FIG. 3 shows an example screen displayed on the operation panel 211. As shown in FIG. 3, the operation panel 211 pertaining to the present embodiment is provided with the liquid crystal display panel 300. When an ECO button 301 is pressed, the liquid crystal display panel 300 displays the value of power consumption until the present time (i.e. accumulated power consumption (Wh) from the beginning of the measurement until the ECO button 301 is pressed) and also displays a target power consumption entry button (touch key) 302 for displaying a target power consumption entry screen, which is used for receiving input of a target value for power consumption from the user.

Figure 4:
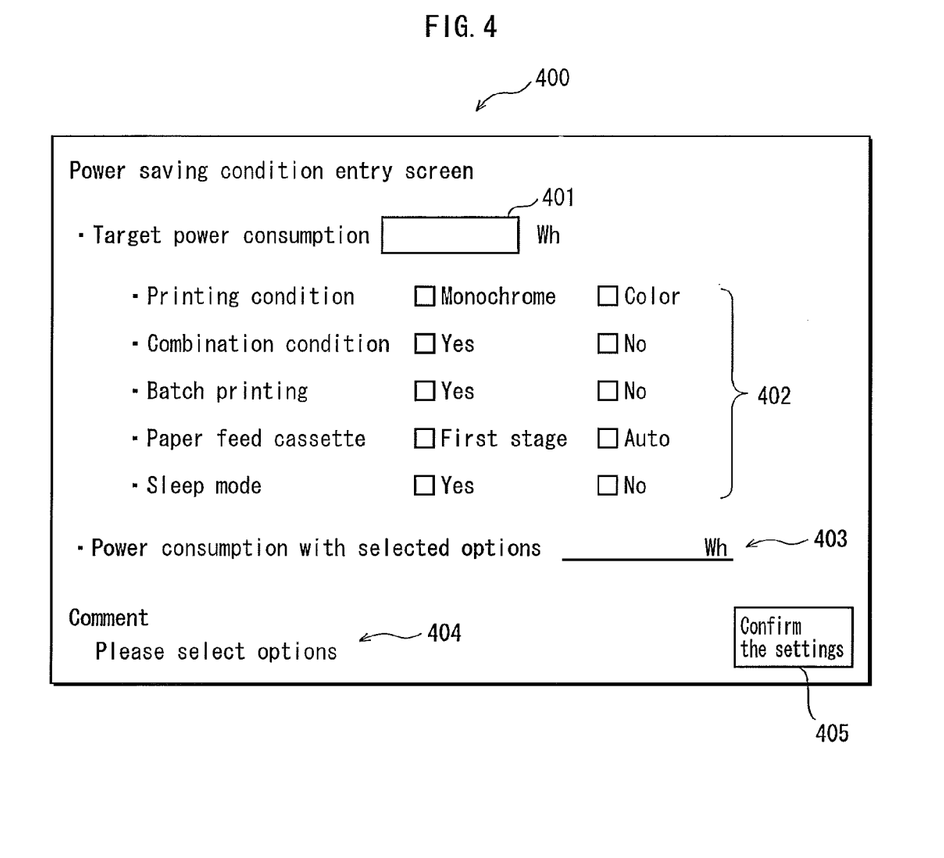
FIG. 4 shows an example of a target power consumption entry screen displayed on a liquid crystal display panel 300 when a target power consumption entry button 302 is touched.

FIG. 4 shows an example of a target power consumption entry screen displayed on the liquid crystal display panel 300 when the target power consumption entry button 302 is touched. As shown in FIG. 4, the target power consumption entry screen 400 is used for receiving input of a target power consumption (accumulated power consumption (Wh) for a predetermined period such as one month, one week or one day. In FIG. 4, the value is input to a target power consumption field 401.), and operational conditions 402 for the image forming apparatus 1. In the present embodiment, the operational conditions available for the image forming apparatus 1 are: a printing condition; a combination condition; whether to enable batch printing; a condition for the paper feed cassette; and whether to enable the sleep mode. The printing condition provides options on whether to perform the image formation in "color" or in "monochrome". When the option "color" is selected, all the imaging units 111Y, 111M, 111C and 111K are operated. On the other hand, when the option "monochrome" is selected, only the imaging unit 111K is operated, and this reduces the power consumption.

The combination condition provides options of selecting either "YES" for always combining the originals (2 in 1 printing in the present embodiment), or "NO" for combining the originals unless specified by a print job. When the option of always combining the originals is selected, the number of prints is smaller, and this option reduces the power consumption by the fixing device. The option "batch printing" provides options on whether to execute a plurality of print jobs in a batch (i.e. "YES") or not (i.e. "NO"). If a plurality of print jobs are executed separately, the fixing device requires warm up each time. On the other hand, if a set of a predetermined number of print jobs are executed in a batch, the fixing device requires warm up only once for the set of print jobs, which reduces the power consumption.

The condition for the paper feed cassette provides options on whether to always use the cassette located at the "first stage" or to use one of the paper feed cassettes according to "automatic" selection as specified by a print job. When the paper feed cassette at the first stage is used, the conveyance distance of recording sheets is shorter than when the paper feed cassette at the second stage or any other following stage is used. Hence, always using the paper feed cassette at the first stage reduces the power consumption for sheet conveyance. In the sleep mode, the image forming apparatus 1 keeps the temperature of the fixing device to be lower than the fixing temperature. Hence, when the sleep mode is enabled, the power consumption is smaller than when the sleep mode is not enabled.

Until all the operational conditions (i.e. options) in the target power consumption entry screen 400 have been entered, a comment saying "Please select options" is displayed as shown in FIG. 4. When all the operational conditions are entered, the value of power consumption 403 is displayed according to the selected options.

Figure 5:
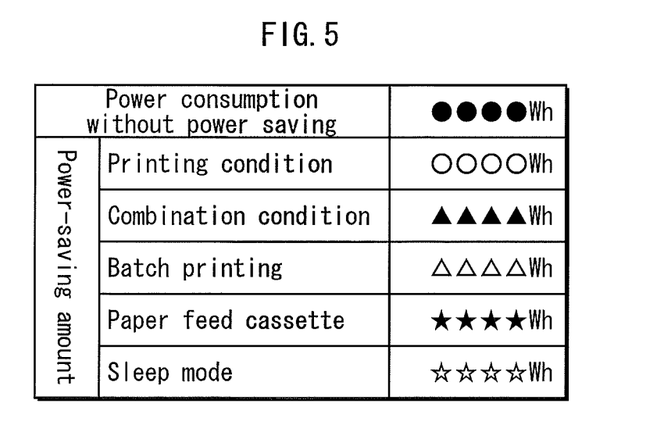
FIG. 5 shows an example table storing values of power consumption.

In the ROM 202 of the control unit 112, the power consumption under the following default conditions are stored: the printing condition is "color"; the combination condition is "NO"; the batch printing is "NO"; the paper feed cassette is "auto"; and the sleep mode is "NO". Furthermore, the power-saving amounts corresponding to the options, such as the power-saving amount when the printing condition is set to "monochrome", are stored in the ROM 202. The power consumption according to the selected options is calculated by subtracting the power-saving amounts corresponding to the selected options from the power consumption under the default conditions. FIG. 5 shows an example of a power consumption table stored in the ROM 202. The power consumption table contains the power saving amounts. The power consumption according to the selected options is calculated based on such a table stored in the ROM 202.

Figure 6:
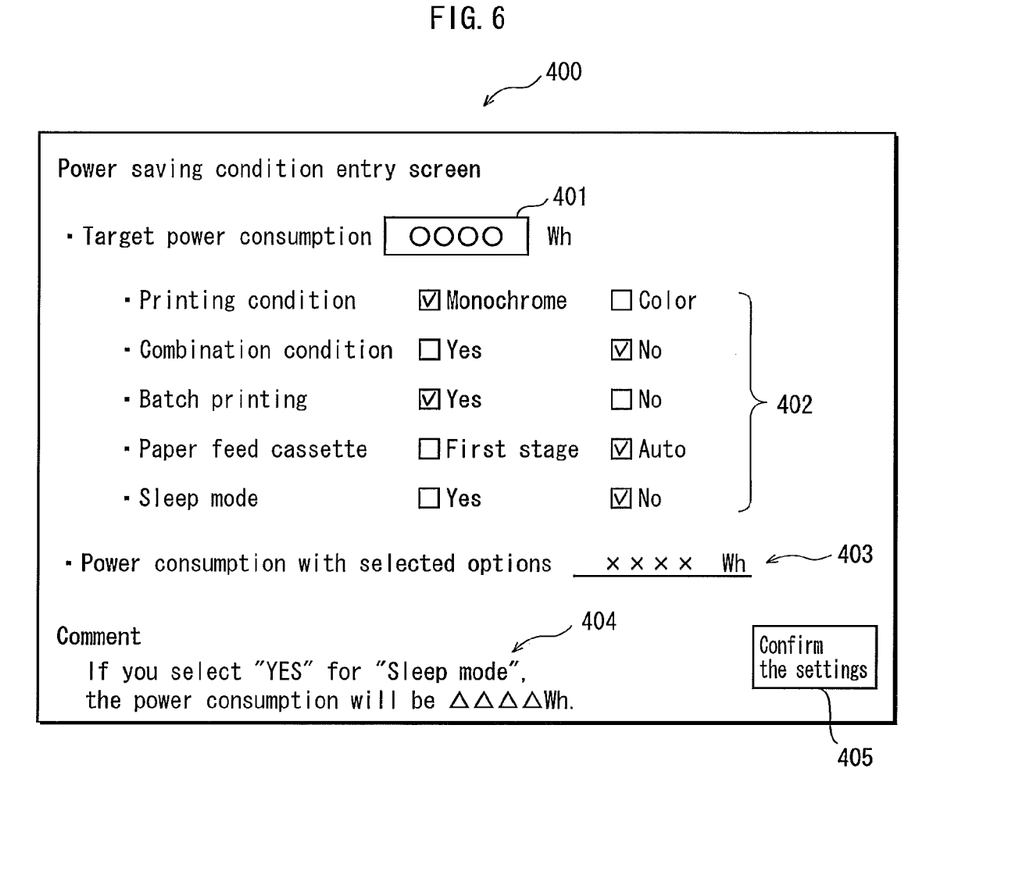
FIG. 6 shows an example comment for the most effective option for achieving the target power consumption.

When the calculated power consumption according to the selected options is greater than the target power consumption, the most effective option for achieving the target power consumption is displayed in the comment field 404 (See the example shown in FIG. 6). The user of the image forming apparatus 1 can easily set the operational conditions for achieving the target power consumption by entering the operational conditions again according to the option displayed in the comment field.

When the setting confirmation button 405 is touched, the control unit 112 stops accepting input from the target power consumption entry screen 400, and returns to the upper-level screen as shown in FIG. 3.

[4] OPERATIONS OF CONTROL UNIT 112

Figure 7:
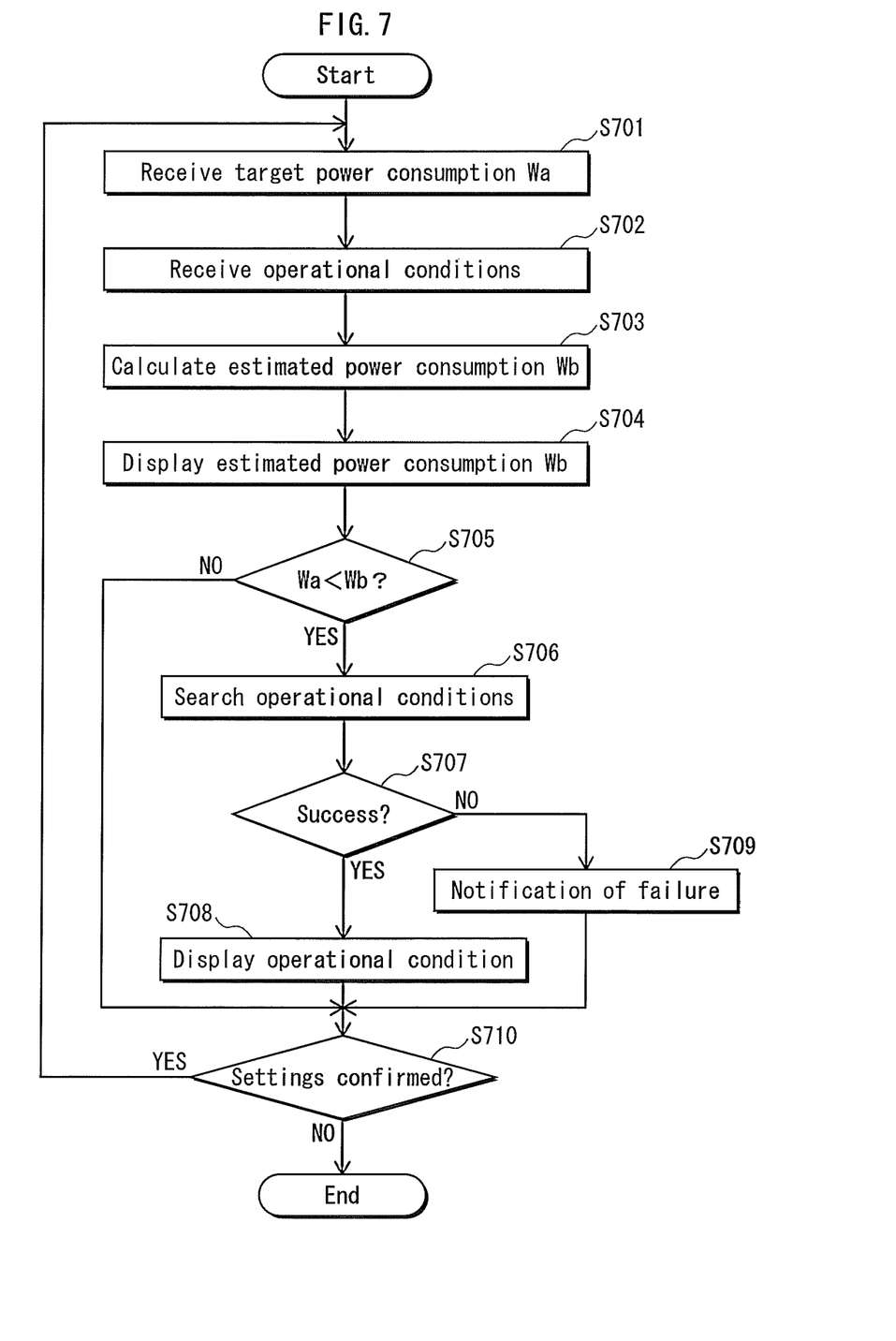
FIG. 7 is a flowchart showing primary operations of the control unit 112.

The following describes operations of the control unit 112. FIG. 7 is a flowchart showing primary operations of the control unit 112. As shown in FIG. 7, the control unit 112 first receives target power consumption Wa (S701) and receives operational conditions (S702) from the operation panel 211. Next, the control unit 112 reads the power consumption table from the ROM 202, obtains estimated power consumption Wb according to the given operational conditions (S703), and displays the estimated power consumption Wb as the power consumption under the given conditions (S704).

When the estimated power consumption Wb is larger than the target power consumption Wa (S705: YES), the control unit 112 refers to the power consumption table in order to find the operational condition with the largest power-saving amount from among the operation conditions for which the option with the higher power consumption is selected (S706). If such an operational condition is found (S707: YES), the control unit 112 displays the desirable option in the comment field 404 of the target power consumption entry screen 400, and displays the estimated power consumption with the option (S708).

If such an operational condition is not found (S707: NO), the control unit 112 displays in the comment field 404 a comment saying that the power consumption cannot be reduced any further (S709). After Step S708 or S709, if the setting confirmation button 405 on the target power consumption entry screen 400 is touched under the condition that the estimated power consumption Wb is not larger than the target power consumption Wa (S705: NO), the control unit 112 completes the processing using the target power consumption entry screen 400. Otherwise (S710: NO), the control unit 112 moves to Step S701 and repeats the processing procedures described above.

[5] MODIFICATION EXAMPLES

The present invention has been described above based on an embodiment. However, the present invention is not limited to the embodiment. The following modifications are acceptable.

(1) In the target power consumption entry screen 400 of the embodiment described above, the printing condition, the combination condition, the batch printing, the paper feed cassette and the sleep mode are listed as examples of operational conditions that can be defined by selecting options. However, the present invention is not limited to these conditions. The following modification may be applied.

Figure 8:
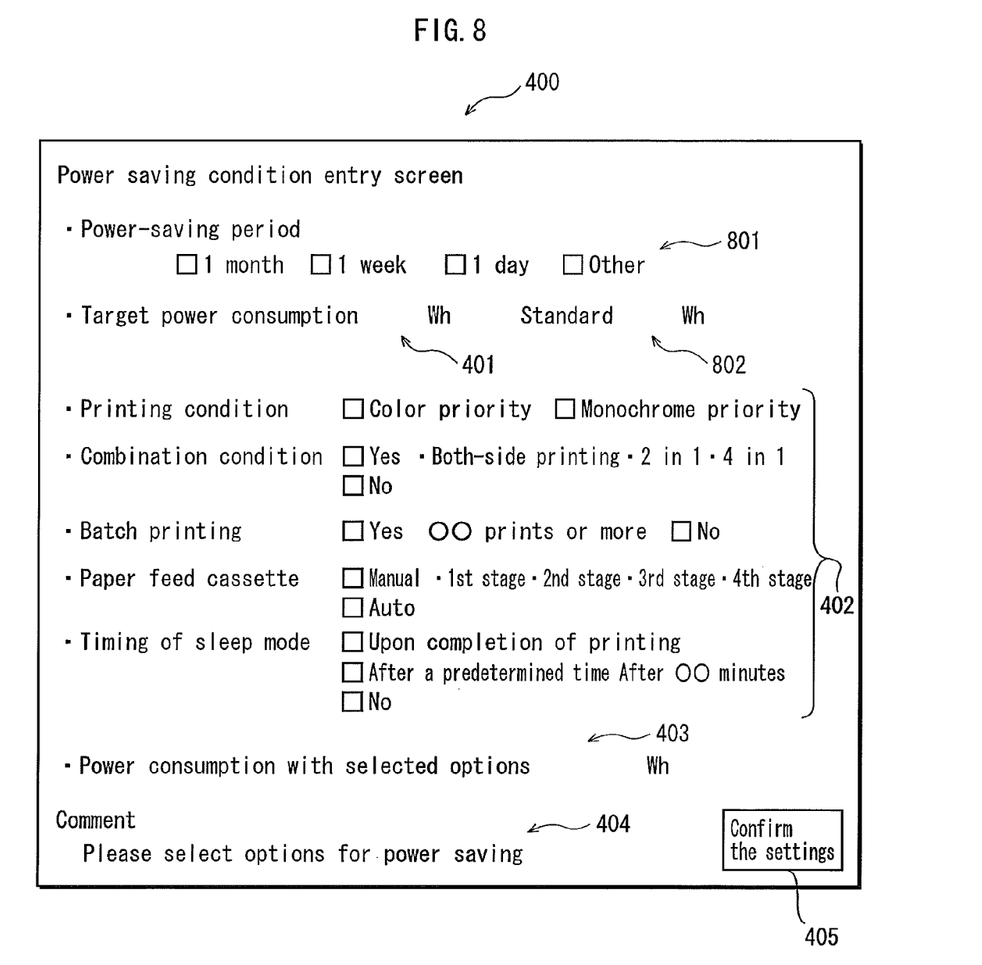
FIG. 8 shows an example of a target power consumption entry screen pertaining to a modification example of the present invention.

FIG. 8 shows an example of a target power consumption entry screen pertaining to the present modification example. Regarding the combination condition, how to combine the originals, namely, by both-side printing, 2 in 1 printing, or 4 in 1 printing, may be selectable as options as shown in FIG. 8. Also, even when the paper feed cassette to be used is fixed to one of the cassettes, the one to be used is not necessarily the cassette at the first stage, and the target power consumption entry screen may receive specification of a paper feed cassette selected by the user. Furthermore, the target power consumption entry screen may receive, from the user, specification of the length of the period from the completion of the most recent print job to the entering into the sleep mode. Such modifications realize precise adjustment on energy saving according to the settings used by the user, and improve user convenience.

Note that among the options for the operational conditions described above, the most effective for power saving is the option of enabling the sleep mode. The second effective is the option of the monochrome printing (printing condition), followed by the batch printing, the combination condition, and the paper feed cassette. The condition about the paper feed cassette is the least effective because this condition only reduces the number of transport motors to be driven, whereas the operational conditions other than the condition about the paper feed cassette reduces the power consumption by the fixing device.

Users are not necessarily familiar with the mechanism of the image forming apparatus. Hence, when precise adjustment on energy saving is allowed as with the present modification example, it is effective to display a preferable option for the operational conditions in the comment field.

Figure 9:
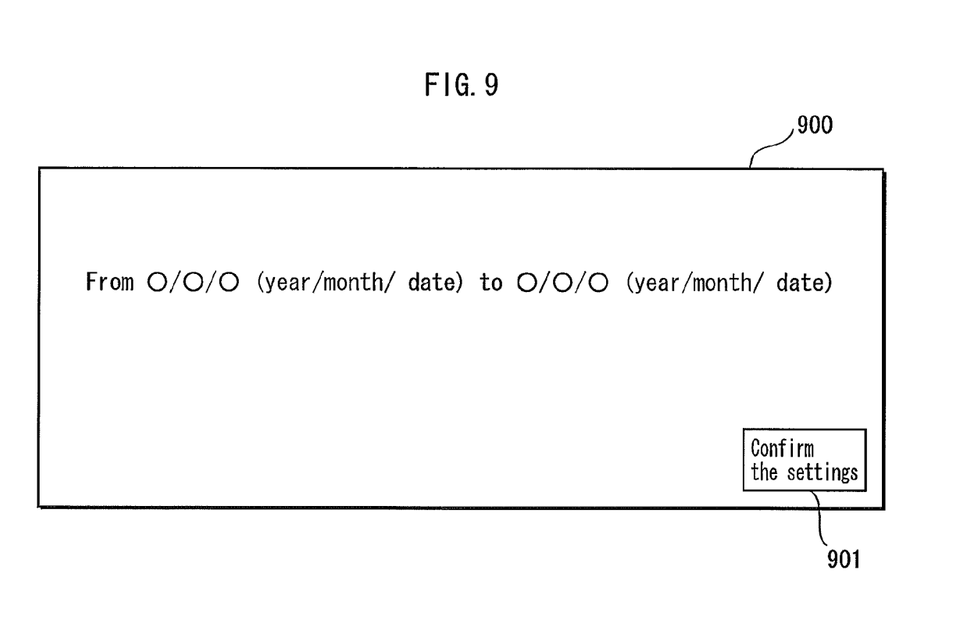
FIG. 9 shows an example window for receiving values specifying the timing of a power-saving period 801.

(2) Although not mentioned in the description of the embodiment above, values of power consumption are specified and calculated for a particular period. This period may be a fixed period (e.g. one month) as with the case of the embodiment above, or determined according to specification by the user as shown in FIG. 8. Among the options for a power-saving period 801 shown in FIG. 8, the option "other" determines not only the length of the period, but also its timing. FIG. 9 shows an example window for receiving values specifying the timing of a power-saving period 801. The timing of the period may be received from a window 900 displayed on the target power consumption entry screen 400 as shown in FIG. 9. When the setting confirmation button 901 is touched after the user inputs specification of the timing, the control unit 112 calculates the time length of the period based on the specified timing, and uses the time length to calculate the value of power consumption.

(3) Although not mentioned in the description of the embodiment above, a value of standard power consumption 802 calculated based on the specification of the power-saving period 801 may be displayed in the target power consumption entry screen 400 as shown in FIG. 8. In many cases, a user of the image forming apparatus do not have adequate knowledge about how much power is consumed by the image forming apparatus. Therefore, displaying the power consumption in the case of a standard usage will be helpful for the user to determine the target power consumption. Moreover, if a user can input a reasonable target power consumption, it will be easy to input reasonable operational conditions. Thus, the user can save time for trial and error in determining the settings for energy saving.

(4) According to the description of the embodiment described above, the target power consumption field 401 and the operational conditions 402 are displayed at the same time. However, the present invention is not limited in such a way, and the following modification may be applied.

Figure 10A:
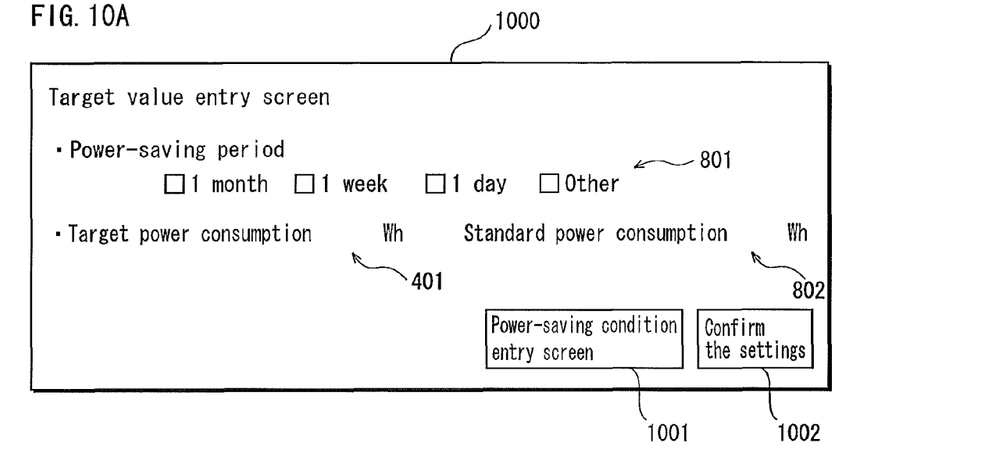
FIG. 10A shows a target value entry screen 1000 and FIG. 10B shows a power-saving condition entry screen 1010.
Figure 10B:
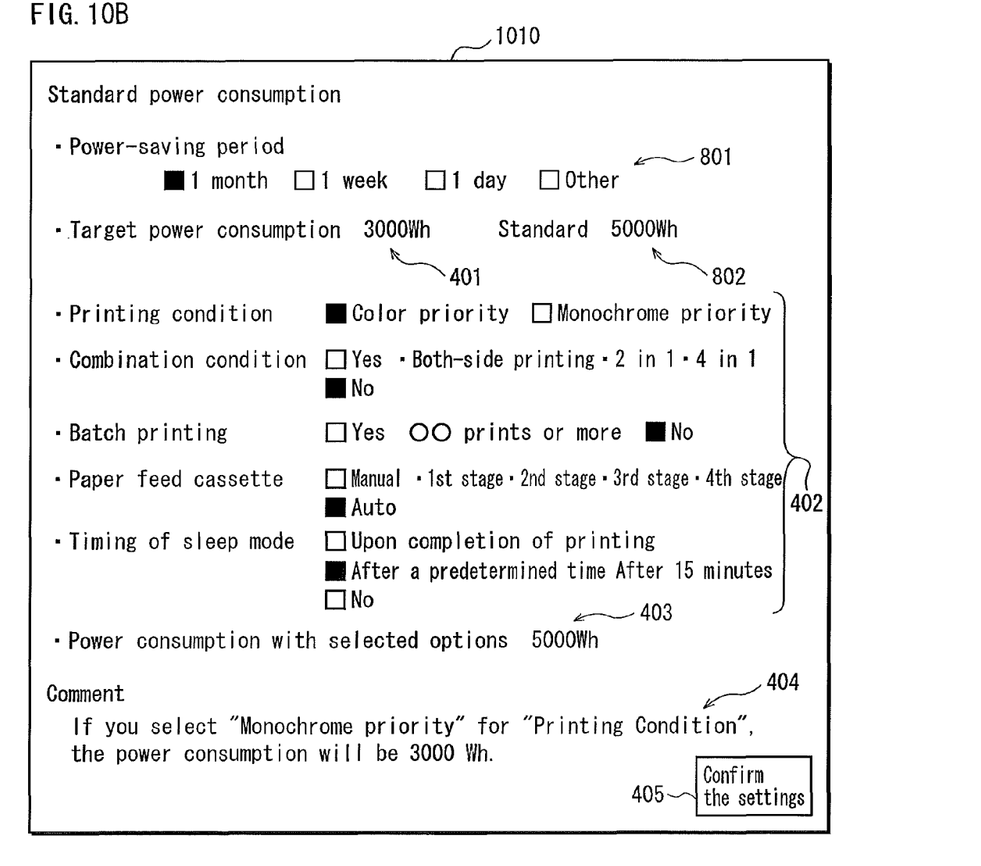

FIGS. 10A and 10B show screens displayed on the operation panel 211 pertaining to the present modification example, where FIG. 10A shows a target value entry screen 1000 and FIG. 10B shows a power-saving condition entry screen 1010. According to this modification example, when the target power consumption entry button 302 (See FIG. 3) is touched, the target value entry screen 1000 will be displayed as shown in FIG. 10A. When specification of the power-saving period 801 by the user is received from the target value entry screen 1000, the control unit 112 calculates and displays the standard power consumption based on standard operational condition. The target value entry screen 1000 also receives specification of the target power consumption.

When the user touches the setting confirmation button 1002 and confirms the settings under the condition that the target power consumption is equal to or larger than the standard power consumption, the image forming apparatus 1 operates according to standard operational conditions.

When the user touches a power-saving condition entry button 1001 under the condition that the target power consumption is smaller than the standard power consumption, a power-saving condition entry screen 1010 as shown in FIG. 10B is displayed. In the present modification example, standard operational conditions are displayed in the power-saving condition entry screen 1010 as the operational conditions 402, and the standard power consumption is displayed as the power consumption 403 according to the selected options. The comment field 404 shows the settings the most effective setting for achieving the target power consumption.

Such a structure saves time required by the user to determine the settings for energy-saving.

[6] CONCLUSION

One aspect of the present invention is an image forming apparatus that operates according to given operational conditions, comprising: a target power consumption receiving unit configured to receive a target value for power consumption; an option receiving unit configured to receive options selected by a user from among a plurality of options defining the operational conditions; a basic data storage unit storing therein basic data for each of the plurality of options, the basic data being used for calculating estimated power consumption; a calculation unit configured to calculate the estimated power consumption from the basic data according to the options selected by the user; an excess informing unit configured to inform the user when the estimated power consumption is greater than the target value; and an alternative option informing unit configured to inform the user of an alternative option among the plurality of options when the estimated power consumption is greater than the target value, the alternative option reducing the estimated power consumption to be equal to or less than the target value. With such a structure the image forming apparatus receives options for defining the operational conditions, it is capable of realize energy saving according to the settings used by the user. In addition, the image forming apparatus informs the user when the estimated power consumption calculated according to the selected options is greater than the target power consumption. Therefore, the user can appropriately change the options according to the target power consumption without calculating the power consumption on his/her own. Furthermore, the user can easily select such options.

The image forming apparatus may further comprise: a standard power consumption storage unit storing therein a standard value for the power consumption; a standard option storage unit storing therein standard options among the plurality of options, the standard options being options for adjusting the estimated power consumption to be the same as the standard value; and a determination unit configured to determine whether the target value is greater than the standard value, wherein the option receiving unit may display the standard options and receive options selected by the user from among the plurality of options when the determination unit determines that the target value is greater than the standard value. This structure saves time it takes for the user to select options. The image forming apparatus may further comprise: an operation panel configured to display information to the user and to receive input from the user, wherein the target power consumption receiving unit may receive the target value for the power consumption from a screen that is different from a screen from which the option receiving unit receives the options selected by the user.

It is preferable that both the target value for the power consumption and the estimated power consumption are related to power consumption for a same period.

The image forming apparatus may further comprise a period receiving unit configured to receive a length of the period.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

The invention claimed is:

1. An image forming apparatus that operates according to given operational conditions, comprising:
   a target power consumption receiving unit configured to receive a target value for power consumption;
   an option receiving unit configured to receive options selected by a user from among a plurality of options defining the operational conditions;
   a basic data storage unit storing therein basic data for each of the plurality of options, the basic data being used for calculating estimated power consumption;
   a calculation unit configured to calculate the estimated power consumption from the basic data according to the options selected by the user;
   an excess informing unit configured to inform the user, together with the options, when the estimated power consumption is greater than the target value; and
   an alternative option informing unit configured to inform the user of an alternative option among the plurality of options when the estimated power consumption is greater than the target value, the alternative option reducing the estimated power consumption to be equal to or less than the target value,
   wherein the target power consumption and the selected options are input by the user, and
   wherein the alternative option informing unit is configured to inform the user, in response to the user inputting the target power consumption and the options, of whether the target power consumption will be achieved.

2. The image forming apparatus of claim 1, further comprising:
   a standard power consumption storage unit storing therein a standard value for the power consumption;
   a standard option storage unit storing therein standard options among the plurality of options, the standard options being options for adjusting the estimated power consumption to be the same as the standard value; and
   a determination unit configured to determine whether the target value is greater than the standard value, wherein
   the option receiving unit displays the standard options and receives options selected by the user from among the plurality of options when the determination unit determines that the target value is greater than the standard value.

3. The image forming apparatus of claim 2, further comprising:
   an operation panel configured to display information to the user and to receive input from the user, wherein
   the target power consumption receiving unit receives the target value for the power consumption from a screen that is different from a screen from which the option receiving unit receives the options selected by the user.

4. The image forming apparatus of claim 1, wherein both the target value for the power consumption and the estimated power consumption are related to power consumption for a same period.

5. The image forming apparatus of claim 4, further comprising:
   a period receiving unit configured to receive a length of the period.

6. The image forming apparatus of claim 1, wherein after the excess informing unit informs the user,
   the target power consumption receiving unit receives the target value for the power consumption again,
   the option receiving unit receives alternative options selected by the user from among the plurality of options,
   the calculation unit calculates the estimated power consumption from the basic data according to the alternative options selected by the user, and
   the excess informing unit informs the user again when the estimated power consumption is still greater than the target value.

7. The image forming apparatus of claim 1, wherein the target value for power consumption is for power consumption of the image forming apparatus.

8. The image forming apparatus of claim 1, wherein the image forming apparatus determines the alternative option by finding an operational condition with the largest power-saving amount from among the operation conditions defined by the plurality of options.

* * * * *